Feb. 4, 1969 D. FINKHAÜSER ET AL 3,426,154

CIRCUIT ARRANGEMENT BRANCH EXCHANGE FOR A TELEPHONE INSTALLATION, ESPECIALLY AN INSTALLATION WITH CODE SELECTION AND IMPULSE SELECTION OF THE SUBSCRIBER STATIONS

Filed April 23, 1964 Sheet 1 of 2

United States Patent Office 3,426,154
Patented Feb. 4, 1969

3,426,154

CIRCUIT ARRANGEMENT BRANCH EXCHANGE FOR A TELEPHONE INSTALLATION, ESPECIALLY AN INSTALLATION WITH CODE SELECTION AND IMPULSE SELECTION OF THE SUBSCRIBER STATIONS

Dieter Finkhaüser, Unterpfaffenhofen, and Walter Strobelt, Munich, Germany, assignors to Siemens Aktiengesellschaft Berlin and Munich, a corporation of Germany Filed Apr. 23, 1964, Ser. No. 362,205
Claims priority, application Germany, Apr. 26, 1963, S 84,917
U.S. Cl. 179—16 6 Claims
Int. Cl. H04m 3/00

ABSTRACT OF THE DISCLOSURE

A circuit arrangement for telephone systems, particularly private branch exchange telephone systems with a subscriber group having code dialing and another subscriber group having decimal impulse dialing, in which relays of the feeding circuit, controlled by signals of the subscriber stations of either group and switching devices designating such group connected through marking switching devices assigned by the calling subscriber station, control the disconnection of receiving devices for signals of the subscriber stations of the other group from the connection line and connection of receiving devices for signals of the calling subscriber station to the connection line.

Figure 1A:
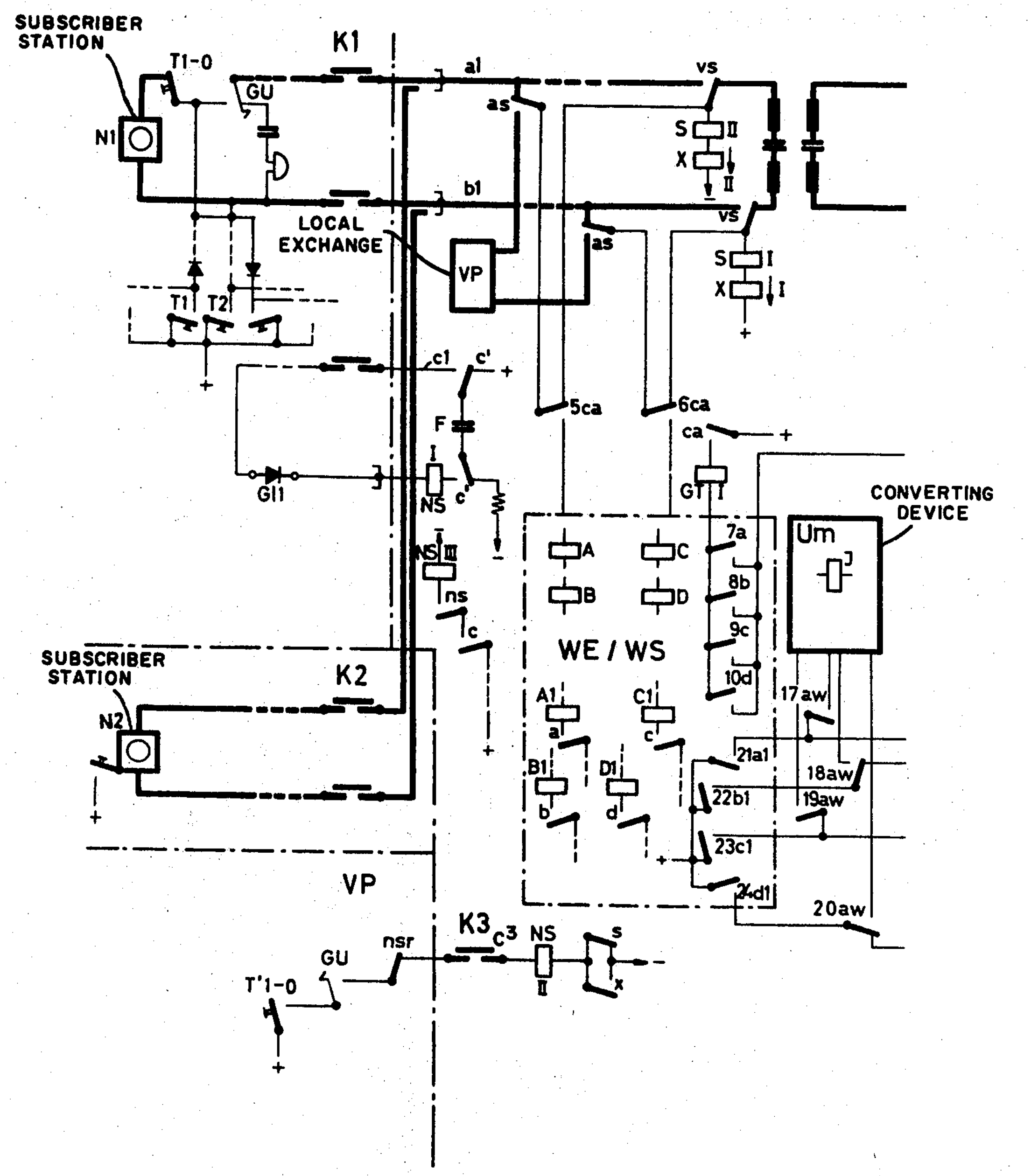

The invention relates to a circuit arrangement for a telephone system, especially a branch exchange installation with code selection and decimal impulse selection, in which to a first group of subscriber stations keys are allocated for code selection, and to a second group of subscriber stations are allocated number selection switches for decimal impulse dialing.

A circuit arrangement is known for a private branch exchange telephone system, in which to a first group of subscriber stations keys for code selection are allocated, and to a second group of subscriber stations, dial switches for impulse selection are allocated, to these different type subscriber stations there are also allocated different transmission lines for the production of connections. The subscriber stations with keys for code selection can be connected only over special transmission lines to which a conversion device (coder/decoder) can be connected, in order to build up connections. An exchange transmission line can be occupied by a subscriber station with keys for code selection only over such a special transmission line.

There also is known a centrally controlled private branch exchange telephone system in which to the different type subscriber stations, dependent upon the resistance value of the subscriber loop, there is allocated either a receiving selector for code selection or a receiving selector for impulse selection in the occupation of a transmission line for the production of an outgoing connection and connection of the central control device to this transmission line. Such arrangements in a known manner, place special demands on the operating and minimum operating current values of the relays and are not utilizable with uniformly constructed relays. The receiving selector connected to the communication line remains connected for the duration of the selection to the transmission line. This also requires a special feed bridge which is allocated to the common control device.

This is achieved according to the invention by a method wherein the relays controlled by selector signals of subscriber stations of the one group, and the switching means characterizing such group, effect a transmission switch-over to the receiving unit for the identifying criteria of the subscriber stations of the one group, and thus disconnects the receiving means for the identifying criteria of the subscriber stations of the other group.

The invention is directed to the elimination of the disadvantages present in known subscriber stations, having different forms of operation.

Thus, in a simple manner, for subscriber stations with keys for code and for subscriber stations with dial switches for decimal impulse selection, all transmission lines are equally utilizable. In this arrangement no separate groups need be formed with transmission lines for sode selection and transmission lines for impulse selection. The matching of key pressure for code selection by a subscriber with impulse selection, and a ground key for the initiation of inquiry, and shift-over is eliminated, so that false connections are prevented. Through the temporary connection of the receiving unit for code selection to the connection path, the feed bridge of the busy transmission line can monitor such connection path. The receiving unit mentioned does not require a feed bridge.

Figure 1B:
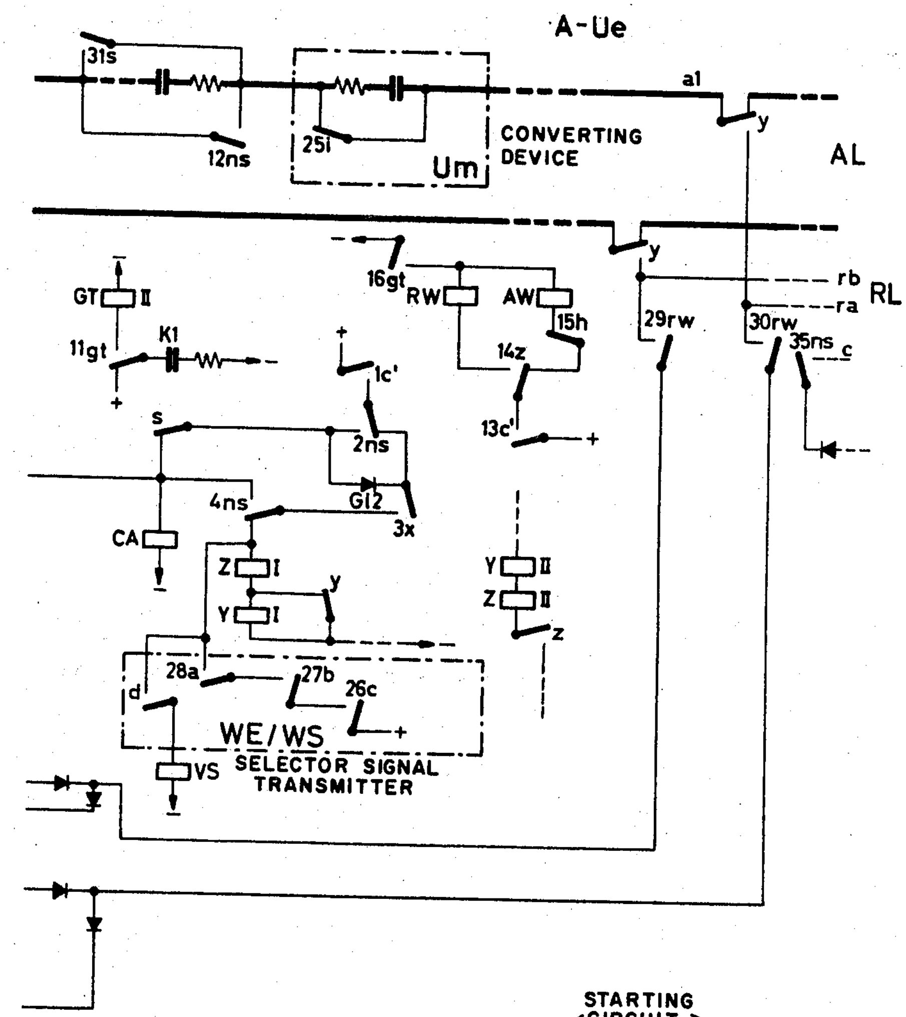
Figure 2:
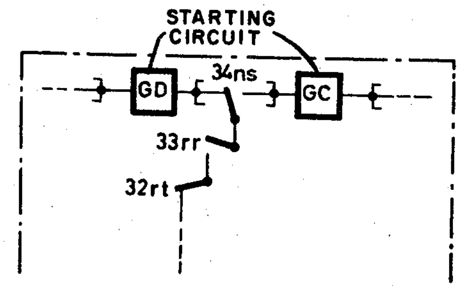

In the drawings, wherein like reference characters indicate like or corresponding elements:

FIGS. 1*a* and 1*b*, when disposed in side by side relation, illustrate a circuit embodying the invention; and FIG. 2 illustrates a circuit for the completion of a connection from one transmission line to a subsequent transmission line.

The drawings illustrate an embodiment of the invention with the important details necessary for an understanding thereof.

In FIG. 1 there is illustrated a branch exchange transmission line A–U*e*, over which the connection line AL of a first communication direction and the line RL of a second communication direction can be seized or occupied. The determination as to which communication direction is to be occupied can be effected by the calling subscriber statiton, for example, by operating the key initiating the inquiry. In the embodiment illustrated there are allocated to the subscriber of station N1, keys by means of which this subscriber can give only coded identification dialing signals. Further it is assumed that the subscriber of station N2 can transmit only decimal dialing impulses by means of a dial switch.

In FIG. 2 an arrangement is illustrated which can serve for the completion of the transmission circuit illustrated in FIG. 1, by means of which the occupation of a subsequent transmission line for coded or decoded selection can be effected as hereafter described.

The subscriber of station N1, by picking up his receiver (not represented) in the usual manner, occupies a free exchange transmission line, for example, the transmission line for selection of an exchange number A–U*e* in FIG. 1, the connection between the subscriber of the station N1 and the transmission line A–U*e* being established over the coupler K1.

In operation, for example, of key T2, the contact T1–0 is opened and the subscriber loop is thereby interrupted, the cradle switch-over contact GU having been operated by the lifting of the receiver. By moving key T2 into actuated position, ground potential is connected to both the *a* conductor and the *b* conductor. The differential relay X becomes energized over winding II, while the relay S remains actuated over winding II. Since subscriber station N1 represents a subscriber with code selection, over the engaged rectifier G11 and over the coupling point K1(*c*) the relay NS which identifies the character of the operation of station N1 and is operated in the coupling of the transmission line A–U*e* and the relay C′ (not illustrated).

The relay NS can also be arranged in a central device, which is only temporarily connected to the transmission line A–U*e*, in which case, in view of the large number of functions to be carried out it may, in turn, be necessary to provide in transmission line A–U*e* a relay for effecting a continuous or intermittent storage representing the condition of relay NS.

There is established by the operation of key T2 and relay NS, therefore, the following circuit for relay CA:

(1) +, 1*c'*2*ns*G12, 3*x*, 4*ns*, C*a*, –

The receiving unit and the selector signal transmitter WE/WS are connected to the calling line (*a*/*b*) over contacts 5*ca* and 6*ca*. The selector identification, i.e. ground potential connected to the *a*— and *b*— conductors is received by the relays A to D in a known manner (not illustrated) and evaluated. The relay GT is actuated over the winding I by closing of one of the contacts 7*a* and 10*d* and characterizes in the transmission line A–U*e* the selection of a coded identification number. In a manner, not illustrated, the selected number is transmitted from the receiver (relays A to D) to the relays A1 to D1, and stored by these relays. A holding circuit for the relay GT is formed over contact 11*gt*, which holding circuit extends over the condenser K1 for the duration of the discharging time of such condenser. Dependent upon relay GT the relays A1 to D1 are held in a manner, not illustrated, thus assuring that relays A1 to D1 store the selected identification number, independently of the operating duration of selector key T2, for a period determined by the discharge time of condenser K1.

The contact 12*ns* briefly short-circuits the impulse contact 31*s*, so that any impulse generation by means of a dial switch is prevented.

Simultaneously with the actuation of relay GT the following circuit is produced for relay AW:

(2) +, 13*c'*, 14*z*, 15*h*, AW, 16*gt*, –

Contacts 17*aw*, 18*aw*, 19*aw* and 20*aw* switch contacts 21*a*1 to 24*d*1 on the conductors leading to the converting device U*m*, in which the selected coded signals are received and, in a known manner, converted into decimal impulses. Contact 25*i* in conductor *a*1 pulses and transmits demical characterizing signals over the exchange line AL to the public exchange.

It should also be mentioned that the operation at the local exchange VP, in the event of an unactuated dial switch, i.e. an unactuated dial rest contact, can control the relay NS over the fork switch and the operated contact T'1–0.

If the subscriber of station on N1, during the existing exchange connections operates a key especially provided for calling, then in the receiving selector, for example, the relays A, B, C, are connected, in a manner not illustrated. Thereby, over contacts 26*c*, 27*b* and 28*a* the relay Z is actuated, which relay controls, in a known manner, the relay Y and thereby indicated in the transmission line A–U*e* the initiation of the calling state. Now, through the actuation of contact 14*z*, a circuit is prepared for the relay RW.

If the subscriber of station N1, through operation of his keys, selects the identifying number of the subscriber station to be called, then in each key actuation, i.e. for each coded signal received in the receiving selector device WE, the relay GT is actuated over the winding I. The relay GT receives over winding II a certain drop-out delay. The relay RW is connected for the actuated time of relay GT in the following circuit:

(3) +, 13*c'*, 14*z*, RW, 16*gt*, –

The selected identifying signal which is transmitted from relays A to D onto relays A1 to D1, in which it is stored independently of the duration of the key pressure and, dependent upon the actuated time of relay GT, is transmitted over contacts 21*a*1 to 24*d*1 and contacts 29*rw* and 30*rw* as a coded criteria over the called line RL.

Through the calling impulse (in a manner not illustrated) a free house transmission line is already occupied, in which this coded criteria is received in a receiving unit. This receiving unit, which according to the embodiment illustrated in FIG. 1, is under the control of relays S and X, and thereby of relay CA, is connected in the call line. A prerequisite for the house transmission line is also the designation of the character of operation of the dialing, calling station, i.e., through contact 35*ns* of relay NS there must, in the subsequent house transmission line, also be designated the character of operation, since it is only then that the actuation of relay CA is possible.

The switch-over of the exchange connection or the restoration of the connection with the exchange line takes place in a known manner by operation of the call key by the called or the calling subscriber station. The release of the connection takes place in a known manner.

If the subscriber of station N2, over a coupler K2, has established a connection with the transmission line A–U*e*, the subscriber of this station, to whom there is allocated only a dial switch for the selection, can in familiar manner transmit decimal dialing impulses to the feed bridge relay S of transmission line A–U*e*. The contact 31*s* transmits the selected impulses over the exchange line to the public exchange. A connection of the receiving unit WE at the call line, through the actuation of relay S and in the impulse generation through drop-out of relay S, cannot take place since the subscriber station N2 in the transmission line A–U*e* is identified as a subscriber station with a dial switch and relay NS of transmission line A–U*e* therefore is not connected. Accordingly no circuit can be completed for relay CA.

If the subscriber of station N2 operates the ground key for the effecting of a calling connection, then in the transmission line A–U*e* the differential relay X is switched on over winding II. For relay Z a circuit is produced over the operated contacts 1*o'* and 3*x*. Relay Z identifies the sign state in the transmission line A–U*e*. The subscriber of station N2 selects with his dial, i.e. by the provision of a decimal dialing impulses, the identifying number of the subscriber station to be called. The contact 31*s* transmits these decimal impulses over the call line RL. These impulses are received, for example, by a feed bridge relay S, which in a similar manner to the feed bridge relay is connected in the transmission line A–Ue. Here, therefore, it is assumed that in the occupied house transmission line there is also provided a feed bridge with relays S and X and through these relays the correction of a receiving unit is effected on reception of coded identification signals.

In the preceding discussion there has been described a system in which the house transmission occupied over the calling line can receive and process both coded criteria and also decimal impulses. The installation can, however, be formed in such a way that the exchange transmission line can be occupied both by the subscriber stations with code selection and also by subscriber stations with impulse selection, in which the house transmission lines are divided into groups. In this case, for the subscriber stations with code selection a special first group of house transmission lines are provided and for the subscriber stations with impulse selection a second group of house transmission lines is provided.

The particular transmission lines, therefore, can receive and process either only coded criteria or only a decimal impulses. In this case, as is illustrated in FIG. 2, the occupation of the house transmission line takes place in dependence upon the character of operation of the calling station. If a subscriber station with dial switch has made a connection over the transmission line A–U*e* in FIG. 1, with the exchange line, and if the subscriber of this station goes into calling connection, in a known manner, only suggested in FIG. 2, an impulse is conducted over contacts 32*rt* and 33*rr* over a known starting chain to the transmission line designated as being free in this starting chain. Since in the connection of a subscriber station having a dial switch to the transmission line A–U*e*, the relay NS is not actuated and the contact 34*ns* is in the rest position, a busy signal is given through contacts 34*ns* to a starting circuit GD, over which only available transmission lines for decimal impulse calling can be occupied.

If, on the other hand, the calling impulse is given by a subscriber station with code selection, the relay NS in the transmission line A–Ue, is actuated in the manner heretofore described, and over contacts 32*rt*, 33*rr* and the occupied 34*ns* an occupation impulse is transmitted, whereby there can be provided only one free transmission line of the transmission lines which are disposed for the reception of coded criteria. In a division of the house transmission lines according to the character of operations of the calling station, a contact of the relays identifying character of operation, for example NS of transmission line A–U*e*, determines the type of transmission lines of which a free transmission line is to be occupied. As already mentioned, relay NS may also be centrally located.

Changes may be made within the scope and spirit of the appended claims which define what is believed to be new and desired to have protected by Letters Patent.

We claim:

1. In a circuit arrangement for a telephone system having code selection subscriber stations, digital dialing subscriber stations and a transmission line, the combination comprising:

a first type of receiving unit for signals of said code selection subscriber stations, a second type of receiving unit for signals of said digital dialing subscriber stations, a feeder circuit and means for coupling the same to said subscriber stations and having relays operable by a signal from said code selection subscriber station, and switch-over means responsive to said relays for connecting the first type of receiving unit to said transmission line and disconnecting the second type of receiving unit from said transmission line respectively.

2. In a circuit arrangement for a telephone system with code selection and decimal impulse dialing, a first group of subscriber stations having keys for code selection and a second group of subscriber stations having dial switches for decimal impulse dialing, a transmission channel, means for coupling a calling subscriber and a receiving subscriber into said transmission channel, a receiving unit for code selection, a receiving unit for impulse dialing, and a switch means responsive to the initiation of a call from a calling subscriber station of said first group for connecting into said transmission channel said receiving unit responsive to code selection signals and to switch out of said transmission channel said receiving unit responsive to decimal pulse dialing signals.

3. A telephone circuit arrangement in accordance with claim 2 wherein said receiving unit for impulse dialing includes a pulse contact for the transfer of decimal pulse dialing signals and wherein said switch means renders said pulse contact inoperative.

4. A telephone circuit arrangement in accordance with claim 2 wherein said subscriber stations have a ground key associated therewith and wherein said receiving unit for code selection has relays for coupling the same to said transmission channel and wherein operation of said ground key renders said relays inoperative.

5. A telephone circuit arrangement according to claim 2 wherein supply bridge relays responsive to code dialing signals control the connection of said code selection receiving unit into said transmission channel and wherein a key is provided at each subscriber position of said impulse dialing subscriber stations and wherein operation of said key disconnects said code selection receiving unit from said transmission channel and initiates operation of said impulse dialing receiving unit.

6. A telephone circuit arrangement in accordance with claim 2 wherein each subscriber position includes switch means for connecting the appropriate one of said receiving units for said transmission channel.

References Cited

UNITED STATES PATENTS

| | | | |
|---|---|---|---|
| 2,153,129 | 4/1939 | Bascom | 179—18 |
| 2,300,951 | 11/1942 | Malthaner | 179—25 |
| 2,358,237 | 9/1944 | Lewis et al. | 179—27 |

FOREIGN PATENTS

| | | |
|---|---|---|
| 1,029,351 | 5/1966 | Great Britain. |
| 1,032,966 | 6/1966 | Great Britain. |

WILLIAM C. COOPER, *Primary Examiner.*